(No Model.)
J. B. DAVIS.
PIPE HOLDER.
No. 522,456. Patented July 3, 1894.
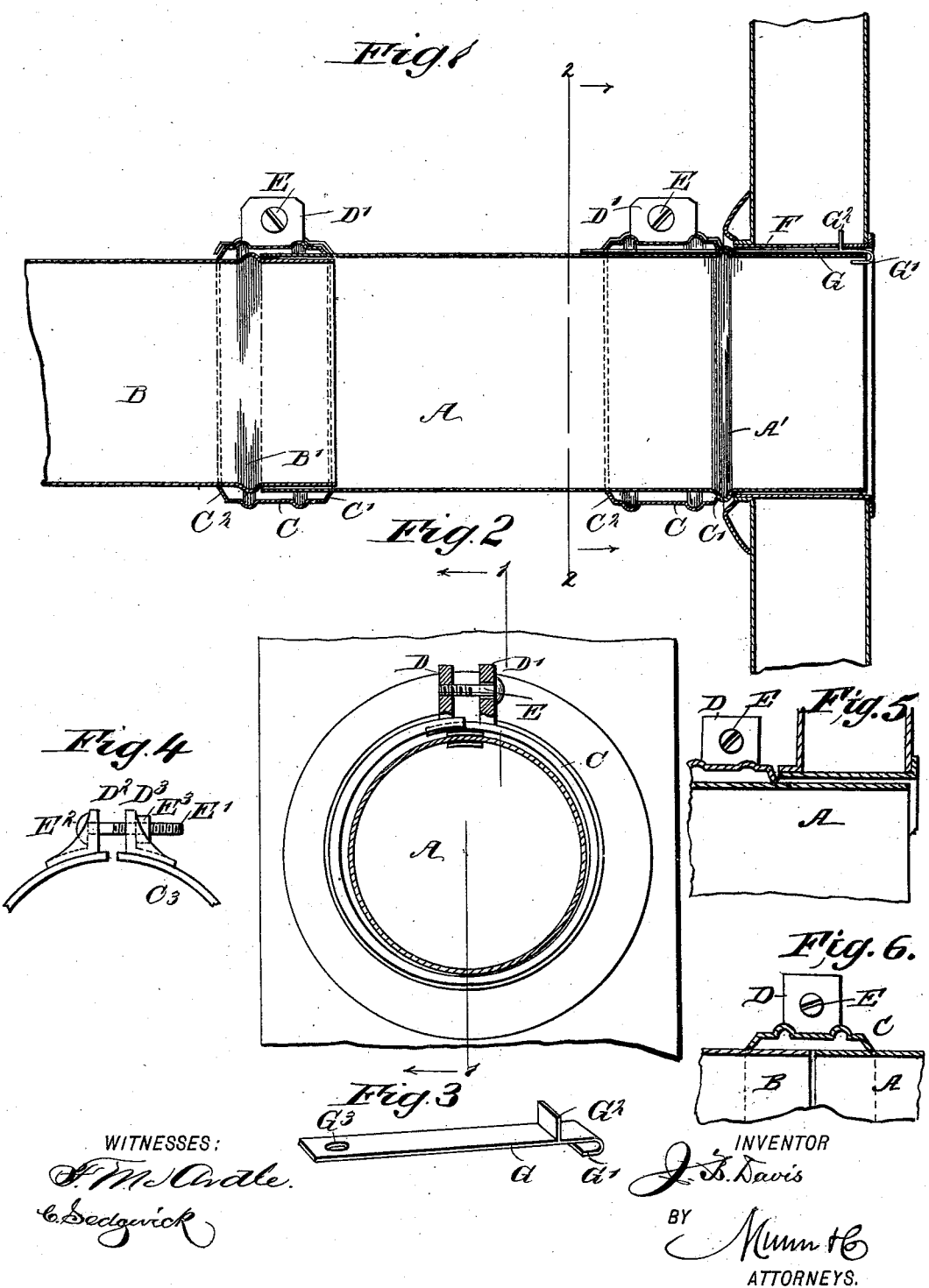

UNITED STATES PATENT OFFICE.

JOHN BROOKS DAVIS, OF MOLINE, ILLINOIS, ASSIGNOR TO HIMSELF AND LOUIS ROSENSTEIN, OF SAME PLACE.

PIPE-HOLDER.

SPECIFICATION forming part of Letters Patent No. 522,456, dated July 3, 1894.

Application filed October 11, 1893. Serial No. 487,864. (No model.)

*To all whom it may concern:*

Be it known that I, JOHN BROOKS DAVIS, of Moline, in the county of Rock Island and State of Illinois, have invented a new and Improved Pipe-Holder, of which the following is a full, clear, and exact description.

The object of the invention is to provide a new and improved stove and furnace pipe holder, which is simple and durable in construction, and arranged to securely hold the pipe in place in the chimney and also to fasten the sections of the pipe in position so as to form a gas and dust-tight joint.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a sectional side elevation of the improvement on the line 1—1 of Fig. 2. Fig. 2 is a transverse section of the same on the line 2—2 of Fig. 1. Fig. 3 is a perspective view of a detail hereinafter more particularly described. Fig. 4 is a side elevation of a modified form of the stove pipe band, and Figs. 5 and 6 are detail sectional views of modifications.

The sections A and B, of the pipe are fitted one in the other, as plainly shown in Fig. 1, the inward movement of the pipe section B into the pipe A, being limited by an annular ridge B', formed near the end of the pipe section B. A band C, is adapted to pass over the jointed pipe sections, the said bands being provided with inwardly turned flanges C' and C², of which the flange C' engages the pipe section A and the other flange C², the pipe section B.

Near the ends of the band C are secured the external lugs D and D', of which the lug D' is provided with an aperture for the passage of a screw E, screwing with its threaded end in a tapped aperture formed in the other lug D. It will be seen that when the screw E is screwed up, the two lugs are drawn together, thus moving the ends of the band in a like direction so as to draw the band tight around the entire circumference of the pipe sections A and B at the joint. In drawing the ends of the band C together, the said ends overlap one another, as plainly indicated in Fig. 2.

As shown in Fig. 4, the band C³ is provided with apertured lugs D², D³ engaged by a bolt E' having its head E² resting on the outer face of the lug D² and its nut E³ abutting on the outer face of the lug D³. By screwing up the nut E³ the band is tightened in the same mannner as screwing in the bolt E above described.

As the annular flanges C' and C² firmly engage the pipe sections A and B, a very tight joint is formed on the jointed pipes, to prevent leakage of gas, at the same time rendering the joint dust-proof. The clamp formed by the band C is also used near the chimney as illustrated in Figs. 1 and 2, so as to fasten this end of the pipe in place to prevent disengagement of the pipe from the thimble F arranged in the chimney, and leading to the flue thereof. In order to securely hold the pipe in place, I provide a bar G formed with an inwardly bent hook G', and an outwardly extending lug G² adapted to be driven through the wall of the thimble F, as plainly shown in Fig. 1, so that the hook G' extends near to the inner end of the thimble at the entrance of the latter to the flue. The outer end of the bar G is engaged by the flanges C' and C² of the band C, the latter being drawn tightly in position over the pipe section so as to securely fasten or clamp the bar G in place on this pipe section.

It is understood that in using this device, the bar G is first put in position on the thimble F, then the end of the pipe is inserted so that the end entering the thimble F engages the hook G', which prevents further inward movement of the pipe, thus terminating the latter at the flue. The band C is then placed on the pipe on the outer end of the thimble F, as plainly shown in Fig. 1, so as to clamp the bar G firmly onto the pipe. The latter cannot now be moved inward owing to the hook G', nor drawn outward on account of the lug G² engaging the thimble F fixed in the chimney wall. The band C can also be used as a stop on thimble F, in case the bar G is omitted and pipe is straight and not formed with a ridge A'. For this purpose the band is fastened a suitable distance from the end of the pipe and this end is pushed into the thimble until the band abuts against the outer edge thereof as shown in Fig. 5. The band may also be used for joining two pipes not fitted one in the other but only abutting at their adjacent edges. The band then overlaps the adjacent ends as shown in Fig. 6. The bar G may also be used without employing the band C for holding the bar in place, and for this purpose the end of the bar is provided with an aperture $G^3$ for the insertion of a wire or nail to fasten the bar to the pipe.

Having thus fully described my invention, I claim as new and desire to secure by Letters Patent—

1. In a device of the class described, the combination with a bar provided with a hook for engaging the end of the pipe and a lug for engaging the thimble, of a clamping band adapted to clamp the said bar to the pipe, substantially as shown and described.

2. In a device of the class described, the combination with a pipe, and a thimble, of a bar secured to the pipe and projecting between the pipe and thimble, said bar being provided with an inwardly extending hook receiving the end of the pipe and an outwardly projecting lug extending through the thimble, substantially as described.

3. In a device of the class described, a bar provided with an inwardly-bent hook, and an outwardly-extending lug adapted to be driven into the flue thimble, substantially as shown and described.

JOHN BROOKS DAVIS.

Witnesses:
OSCAR J. WILSON,
JOHN C. H. READ.